G. W. BOWERS.

GRINDING MACHINE.

APPLICATION FILED DEC. 2, 1912.

1,072,692.

Patented Sept. 9, 1913.

5 SHEETS—SHEET 1.

Witnesses:

P. W. Pezzetti

G. L. Johnson

Inventor:

Geo. W. Bowers by

[illegible] Atty.

G. W. BOWERS.

GRINDING MACHINE.

APPLICATION FILED DEC. 2, 1912.

1,072,692. Patented Sept. 9, 1913.

5 SHEETS—SHEET 2.

Witnesses:
P. N. Pezzetti
G. L. Johnson

Inventor:
Geo. W. Bowers
by Wright Brown Quinby & May
attys.

G. W. BOWERS.
GRINDING MACHINE.
APPLICATION FILED DEC. 2, 1912.

1,072,692.

Patented Sept. 9, 1913.

5 SHEETS—SHEET 3.

Witnesses:
P. W. Pezzetti
G. L. Johnson

Inventor
Geo. W. Bowers
by Wright Brown Quinby & May
attys.

G. W. BOWERS.

GRINDING MACHINE.

APPLICATION FILED DEC. 2, 1912.

1,072,692.

Patented Sept. 9, 1913.

5 SHEETS—SHEET 4.

Witnesses:

P. W. Pezzetti

G. L. Johnson

Inventor:

Geo. W. Bowers by Wright Brown Quinby & May Attys.

G. W. BOWERS.
GRINDING MACHINE.
APPLICATION FILED DEC. 2, 1912.

1,072,692.

Patented Sept. 9, 1913.

SHEETS—SHEET

Witnesses:
P. W. Pezzetti
G. L. Johnson

Inventor:
Geo. W. Bowers.
by Wright Brown Quinby & May
Attys.

UNITED STATES PATENT OFFICE.

GEORGE W. BOWERS, OF SOMERVILLE, MASSACHUSETTS.

GRINDING-MACHINE.

1,072,692. Specification of Letters Patent. Patented Sept. 9, 1913.

Application filed December 2, 1912. Serial No. 734,450.

*To all whom it may concern:*

Be it known that I, George W. Bowers, a citizen of the United States, and resident of Somerville, in the county of Middlesex and State of Massachusetts, have invented certain new and useful Improvements in Grinding-Machines, of which the following is a specification.

Figure 12:
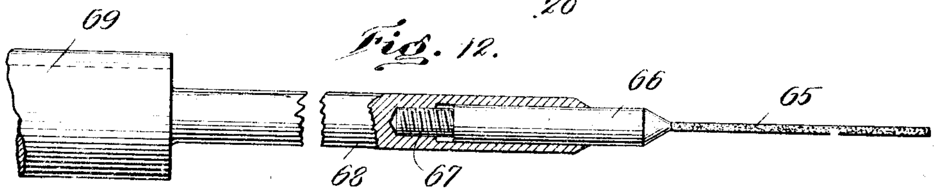

This invention relates to machines for grinding internal surfaces, and while the embodiment illustrated was designed especially for operating on surfaces which require the use of grinding tools of the size and character known as "diamond laps" such as shown in Figure 12, the machine may be made in larger sizes and may employ other forms and sizes of rotary grinding tools.

The embodiment of the invention illustrated in the accompanying drawings is especially adapted for grinding true and straight the inner faces of the jaws of the split chucks used in watch or bench lathes. It is to be understood at the outset, however, that I do not limit myself to the use described, as the machine may be employed for producing other accurate work, such as bearings for machines, bushings for fixtures, gages, jigs, etc., either in large or small sizes, according to the size of machine used to do the work.

One of the objects of my invention is to produce a machine that will enable a long lap to be employed and still without liability of producing other than true results in the work. By employing a long lap and a long traverse of the carriage which supports the work, the traverse being in the direction of the axis of rotation of the work and lap, I am able to produce better results and obtain them more quickly than with a machine employing a lap which is supported at one end only and which necessarily then must have but a short traverse during the grinding operation because of the liability of flexing of the said lap.

Another object of the invention is to provide improved means for indicating the progress or completion of the work.

To these ends my invention consists in the improvements which I shall now proceed to describe and claim.

Figures 1, 16:
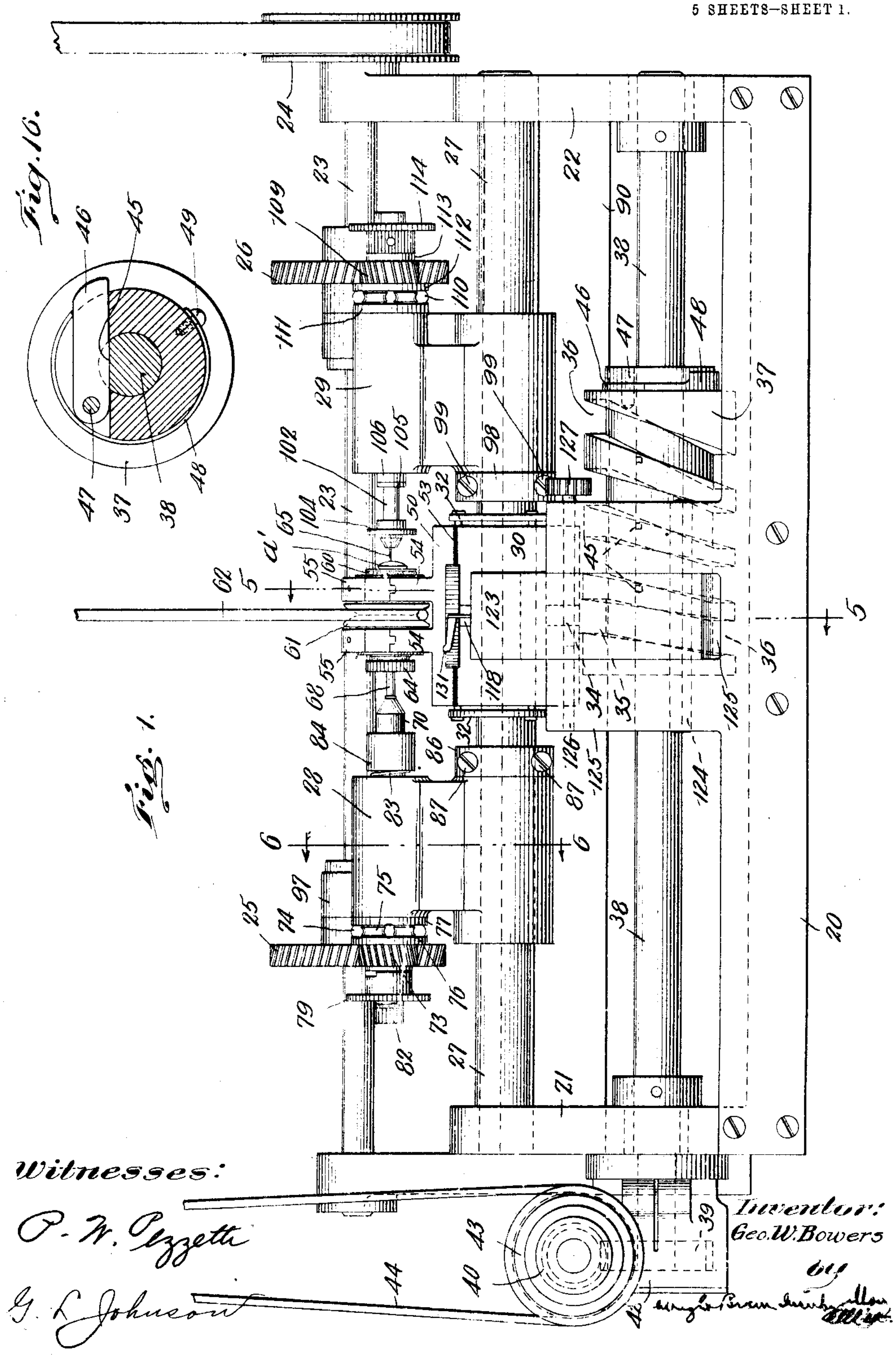
Figure 2:
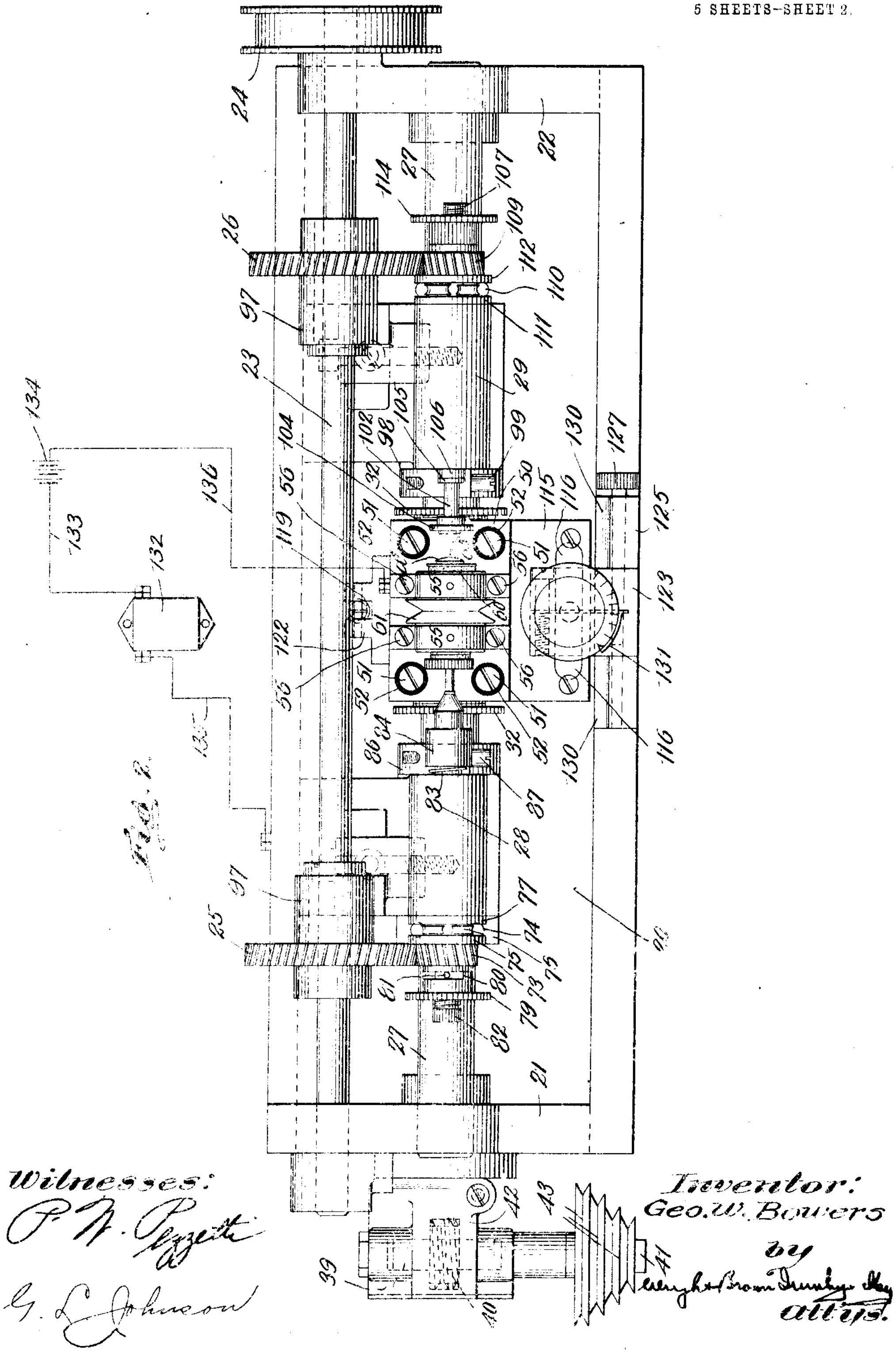
Figure 3:
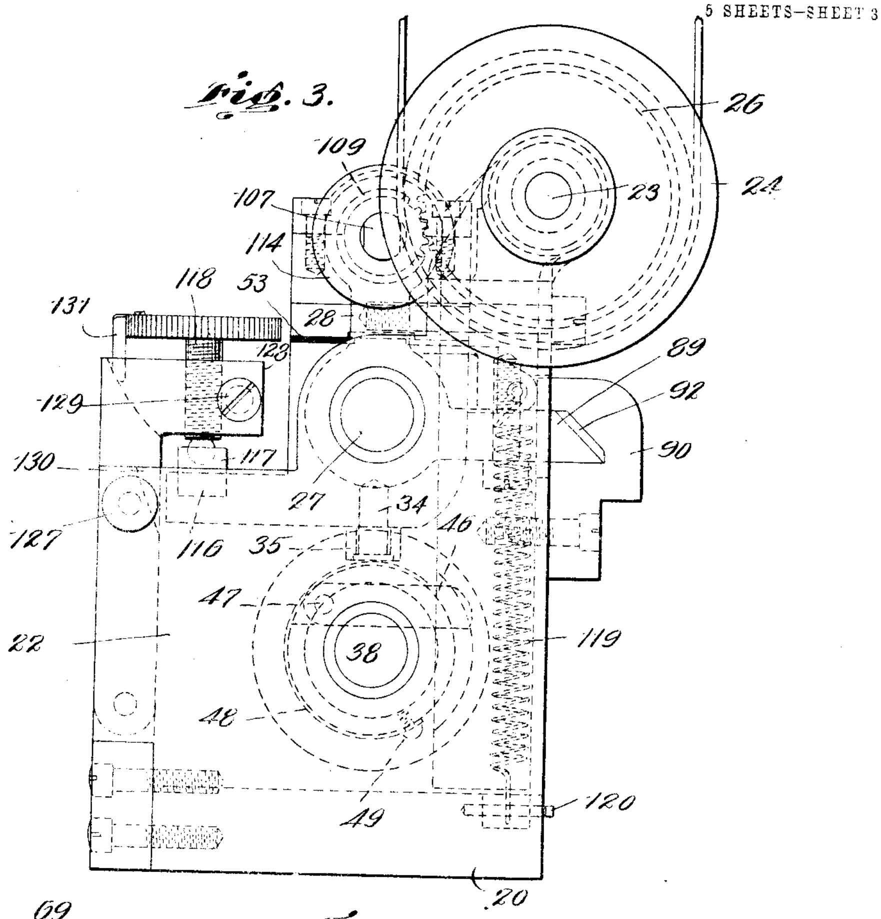
Figures 13, 14, 15:
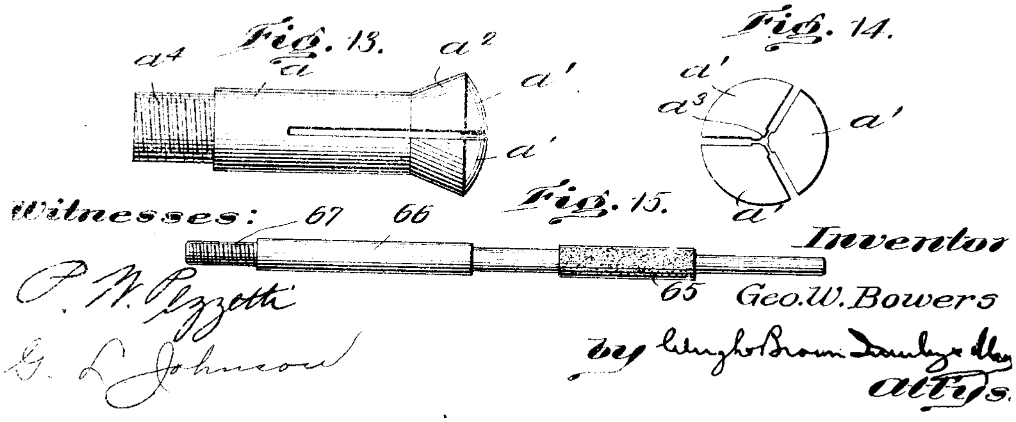
Figures 1A, 4, 7, 8, 9, 10, 11:
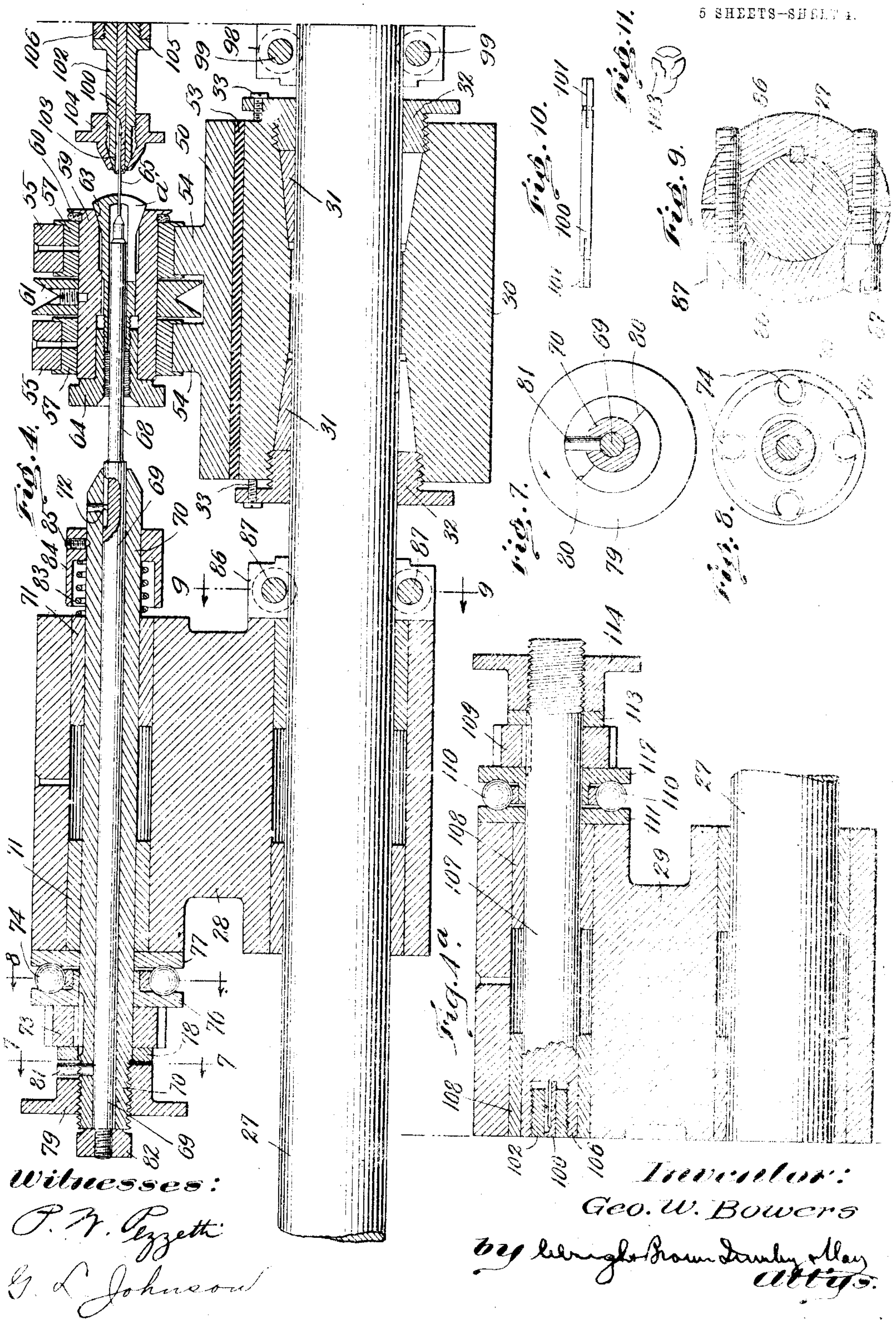
Figure 6:
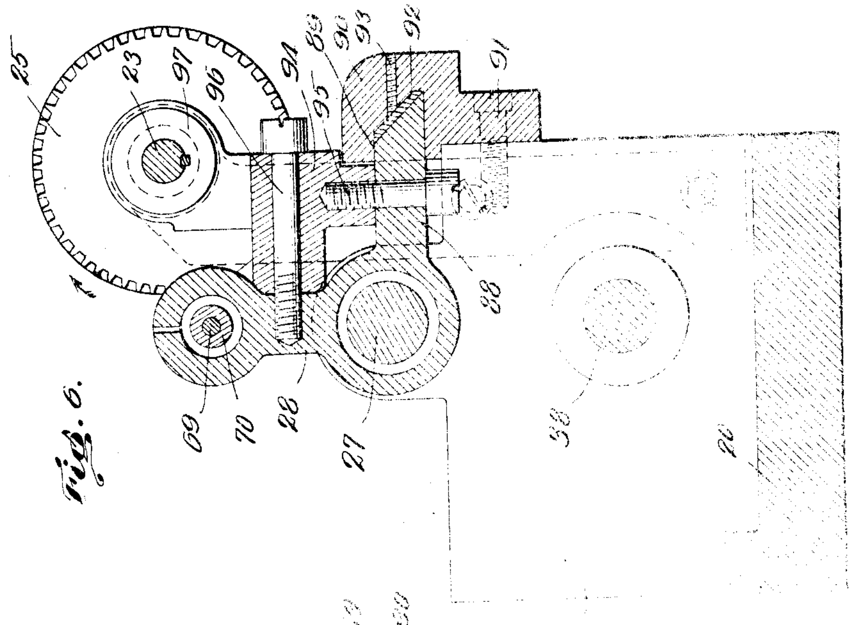
Figure 5:
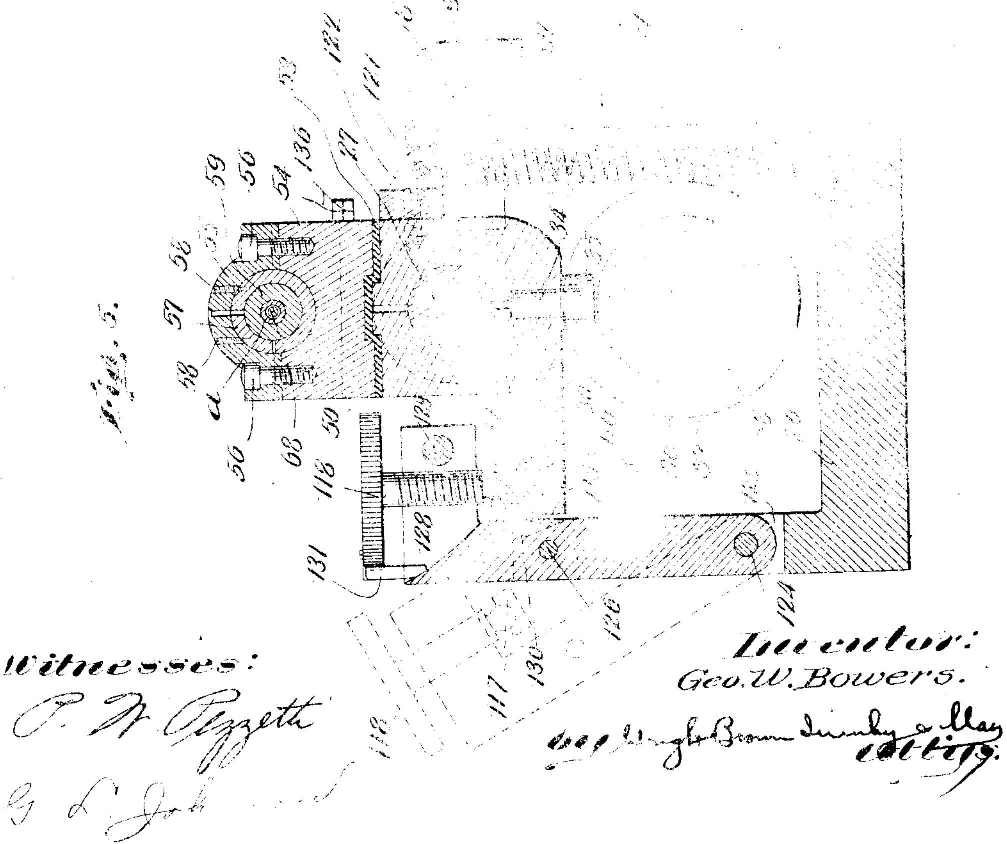

Of the accompanying drawings: Fig. 1 is a front elevation of a machine embodying my improvements; Fig. 2 is a plan view of the same; Fig. 3 is an elevation from the right of Fig. 1; Figs. 4 and 4ª together represent a longitudinal section of the complete machine, excepting the frame work or supports, said figures being on a larger scale than Figs. 1 and 2; Fig. 5 represents a section on line 5—5 of Fig. 1, on a larger scale; Fig. 6 represents a section on line 6—6 of Fig. 1, on a larger scale; Figs. 7, 8 and 9 represent sections on lines 7—7, 8—8 and 9—9 respectively of Fig. 4; Fig. 10 is a detail plan view of the gripper for one end of the grinding tool or lap; Fig. 11 is an end view of the chuck jaws or sleeve for clamping the gripper shown in Fig. 10; Fig. 12 is a detail elevation, partly in section, of the grinding lap and its holding or carrying spindle, enlarged; Figs. 13 and 14 are respectively a side elevation and end view, enlarged, of the chuck or work which is acted upon by the grinding lap; Fig. 15 is an elevation, enlarged, of one of many other forms of grinding laps which may be employed in place of the one shown in Fig. 12; Fig. 16 is a sectional view illustrating the means for securing the adjustment of the cam hub.

Similar reference characters indicate the same or similar parts in all of the views.

The base 20 of the machine has end uprights 21, 22 which support a shaft 23 having a pulley 24 adapted to be driven by a suitable belt, said shaft having two helical gears 25, 26. It may be stated here that these gears, as well as the pinions which intermesh therewith, are preferably of fiber, this material, as well as the inclination of the intermeshing teeth, tending to reduce noise, for reasons, one of which is that it is essential that progress of the work may be audibly known to the attendant.

Supported by the end uprights is a rod 27, the work supporting carriage being mounted to be shifted longitudinally of said rod 27. Mounted on said rod and at opposite sides of the carriage 30 are two brackets or blocks 28, 29, which will be hereinafter referred to more in detail. As best shown in Fig. 4, cone split bushings 31 are interposed between the central bore of the carriage 30 and the rod 27, adjusting collars 32 being employed for shifting the bushing 31 to compensate for wear, jam nuts 33 being employed for retaining the adjustment of the collars 32. Projecting downwardly from the carriage 30 is a pin 34 having a roll 35 engaging one of a plurality of cam grooves 36 (Fig. 1) in a hub 37 splined on a shaft 38, which is mounted in bearings provided in the end uprights 21, 22. The cam grooves 36 are of different pitch, the hub 37 being adjustable along the shaft 38 by means hereinafter described, so that a greater or lesser amount of traversing movement of the carriage longitudinally of the rod 27 may be secured.

The shaft 38 has a worm wheel 39, as indicated by dotted lines in Fig. 2, said worm wheel meshing with a worm 40 carried by a shaft 41 mounted in a bracket 42 and having cone pulleys 43 so that a driving belt 44 may be engaged with either one of the pulleys 43 to impart greater or lesser speed of rotation to the shaft 38 and its carriage-traversing cam hub. To secure the cam hub in selected position, the shaft 38 is provided with a series of notches 45 (Fig. 16), with either one of which a latch 46 pivoted at 47 to the hub may be engaged (Fig. 3). A spring 48 secured to the hub as by a screw 49 bears on the latch to retain it in a notch 45. As hereinafter described, when the cam hub is to be adjusted longitudinally of the shaft 38 the carriage is temporarily shifted so as to swing its roll 35 out of the cam grooves so that the said roll will not present an obstruction to the longitudinal shifting of the cam hub.

As shown in Figs. 1, 4 and 5, the carriage has a top piece 50 secured to it by screws 51 (Fig. 2), the screws being surrounded by insulating bushings, and an insulating plate or layer being interposed between the body 30 of the carriage and the top piece 50. The object of this insulating will be explained hereinafter. Rising from the top piece 50 are ears 54 having caps 55 secured thereto by screws 56 (Fig. 5), the said ears and their caps forming bearings for flanged split bushings 57 (Fig. 4). Screws 58 (Fig. 5) passing through the cap pieces and into the bushings prevent rotation of the latter, and consequently keep the oil holes shown in Fig. 4 in alinement. Rotatively mounted in the bushings 57 is a sleeve or work chuck 59 (Fig. 4) having one end flanged to retain between it and the adjacent bushing 57 an oil ring 60 which may be composed of absorbent material such as felt. Secured to the sleeve 59 between the bushings 57 is a pulley 61 adapted to be driven by a pulley 62 (Fig. 1). The longitudinal recess or opening in the sleeve 59 is cone-shaped at one end as at 63 in Fig. 4, and the other end of said sleeve 59 rotatively supports a sleeve nut 64 which is internally threaded. As shown in Fig. 13, the piece of work which has to be acted upon by the lap comprises a chuck $a$ having jaws $a'$, the outer faces of which are inclined as at $a^2$, the inner apexes of the segmental jaws being formed to present a small round aperture $a^3$ (Fig. 14). It is these faces of the inner apexes of the jaws of the chuck which are to be ground by the lap or grinding tool 65. As shown in Fig. 13, one end of the work or chuck $a$ is threaded as at $a^4$. When this chuck or piece of work is to be placed in position to have its jaw faces ground, it is inserted in the sleeve 59, as shown in Fig. 4, with the outer faces $a^2$ of the chuck engaging the cone recess 63 in the sleeve 59. The sleeve nut 64 is inserted and the internal thread of the latter engages the threaded end $a^4$ of the chuck $a$ and by then rotating said nut 64 the chuck $a$ is drawn into the sleeve so that there is sufficient frictional binding to cause said chuck to be rotated by the belt on pulley 61.

Referring to Fig. 12, which is greatly enlarged from actual size, the grinding element 65 comprises a cylinder rod or wire coated with an abrasive material and is termed a "diamond lap." It has a shank 66 provided with a threaded rear end 67, said shank fitting a longitudinal socket in the tip of the reduced portion 68 of a spindle 69, the threaded end 67 of the shank 66 entering a threaded inner end of the recess which supports the shank 66. It may be mentioned here that in Fig. 15 I show a similar device, which is one of many forms that may be substituted for the one shown in Fig. 12, the grinding element shown in Fig. 15 having the same essential parts as the ones shown in Fig. 12. As best shown in Fig. 4, the spindle 69 is mounted in a sleeve shaft 70 mounted in bearings 71 in a longitudinal aperture formed in the bracket or block 28. The spindle 69 has a longitudinal groove to receive a pin 72 projecting inwardly from the sleeve shaft 70, which constitutes a connection that will cause the spindle 69 to rotate with said sleeve shaft but which will permit the spindle to be slid toward the left in Fig. 4 either to remove entirely said spindle through said sleeve shaft or to withdraw it far enough to permit the substitution of one piece of work for another supported by the carriage 30. A pinion 73 which meshes with gear 25 (Fig. 2) is keyed on the shaft 70. Anti-friction balls 74 carried by a ring 75 (Figs. 4 and 8) are mounted between raceways 76, 77, this ball bearing including the raceways being interposed between the pinion 73 of the end of the bearing for the shaft provided in block 28. A washer 78 bears against the outer side of the pinion 73. A nut 79 is threaded upon the end portion of the sleeve shaft 70, said nut being cut away at its inner end to present two shoulders 80 (Figs. 2 and 7). A pin 81 driven tightly into the sleeve shaft with its inner end flush with the internal bore thereof projects into the cut-away portion of the nut between the two shoulders 80 [illegible] 82 [illegible] a [illegible] outer end of the spindle. [illegible] collar [illegible] sleeve shaft [illegible] recessed collar [illegible] to hold them by a screw 85, [illegible] to shift the sleeve shaft [illegible] the right in Fig. [illegible] in order that [illegible] of the [illegible] may be understood I will briefly refer here to what is explained later, viz., that the grinding tool or lap is tensioned. [illegible] the right hand end of the lap in Fig. 4 [illegible] 12 is gripped by a rotating device [illegible] after explained. It is desirable [illegible] shall be just the right amount of [illegible] pull upon the grinding lap [illegible] steady, but not an excessive pull [illegible]. When the spindle 69 is inserted toward the position shown in Fig. 4, it is moved to a position which brings the nut 82 against the outer end of the sleeve shaft, the said nut 82 being therefore a stop to limit the inward position of the spindle relatively to the sleeve shaft. Then after the end or tip of the lap has been gripped as hereinafter explained, the operator rotates the nut 79, which, by bearing against the washer 78, causes the sleeve shaft and the connected spindle 69 to be drawn outwardly sufficiently to bring about the desired tension upon the grinding tool. The pin [illegible], however, projecting into the recess between the two shoulders 80 of the nut 79, prevents excessive movement that might tend to break the grinding tool.

Of course the length of the grinding tool may be varied. For this reason it is desirable that both of the blocks 28, 29 shall be capable of being adjustably secured lengthwise of the [illegible] rod 27. As shown in Figs. 4 and 9, a divided or two-part collar 86 is fitted to the rod 27, the two parts being clamped upon said rod by screws 87. This two-part collar can be adjustably clamped upon the rod 27 so as to determine the position of the block 28 relatively to the other block 29 and the carriage 30. As presently described, the other block 29 has similar means for adjustably determining its position relatively to the rod 27.

Both of the blocks 28, 29 are prevented from shifting about the axis of the rod 27 by means which I will now describe, chiefly in connection with Fig. 6. As shown in Fig. 6 the block 28 is formed or provided with a horizontal web 88 which enters a groove 89 in a bracket 90 secured by screws 91 to the frame of the machine. The inner edge of said web is preferably inclined and against it a gib 92 is adjustably held by a screw 93. This structure permits the block 28 to be adjustably shifted along the rod 27, but prevents any oscillatory movement upon said rod. As shown in said Fig. 6, a bracket 94 is secured to the web 88 by a screw [illegible] and to the block 28 by a screw 96, said bracket having a bearing 97 which supports an intermediate lengthwise portion of the shaft [illegible]. As shown in Fig. 2, there are two of these bearings 97, one adjacent each of the bars 28, 29.

In Fig. 4 the divided collar 98 and clamp screws 99 serve the same purpose in connection with the block 29 shown in Fig. 4ª as served by the collar 86 and screws 87 in connection with the block 28, viz., to determine adjustably the position of the block [illegible] longitudinally of the rod 27 and relatively to block 28 and carriage 30, thus providing for varying lengths of either work or tool. The mechanism which supports the other end or tip of the grinding element 65 comprises a rod 100 (Figs. 4 and 10) having a longitudinal slot or groove 101 at each end. For convenience of distinguishing description I shall refer to this member as the gripper. Near each end is [illegible] annular groove so as to increase the resilience of the portions beyond the grooves. It is double ended, as shown in Fig. 10, to enable either end to be used, the end of the grinding element being laid in a groove 101, and the receiving end of the gripper being then clamped upon the end of the grinding element by a chuck comprising a barrel 102 having jaws 103 (Fig. 11), which jaws are collapsed by a clamping screw 104 threaded upon the chuck barrel 102. The chuck barrel has a flange 105 which abuts the internally threaded end 106 of a recessed shaft or spindle 107 mounted in bushings 108 in the longitudinal aperture of bracket or block 29 (Fig. 4ª). A pinion 109 keyed on the shaft 107 meshes with the gear 26 on shaft 23 (Fig. 2). Anti-friction balls 110 spaced by a ring similar to that shown at 75 [illegible] g. [illegible] are interposed between raceways [illegible] and [illegible] said raceways being interposed between the pinion 109 and the end of bracket 29. A washer 113 is held against pinion 109 by a nut 114 by means of which the longitudinal position of the shaft or spindle 107 relatively to the bearing therefor in bracket 29 may be adjustably determined.

It will now be understood that when the piece of work such as the chuck $a$ is placed in the carrying chuck, and the grinding element 65 is inserted through the said chuck a toward the position shown in Fig. 4, and the end of said grinding element is clamped by the members 100, 102, the nut 79 on the outer end of the shaft 70 is adjusted as hereinbefore described so as to tension the grinding element 65 to the proper degree, after which the machine is started and the two spindles 69 and 107 are rotated in unison in one direction by the gearing 25, 26, 73 and 109. In practice the belt 62 on pulley 61 is actuated so as to rotate the piece of work *a* in a direction opposite to the direction of rotation of the grinding element. During the grinding operation the carriage 30 travels back and forth so as to shift the work lengthwise of the grinding element to an extent determined by the particular cam groove 36 (Fig. 1) with which the pin and roll 35 of the carriage are engaged. The amount of shifting movement of the carriage is varied according to which one of the cam grooves 36 is employed, the adjustment of the hub 37 on the shaft 38 as hereinbefore described providing for this. Of course, the diameter of the grinding element is such as to not fill the hole to be ground before starting the grinding operation. I have provided means, however, for adjusting the work laterally during the grinding operation so that the diameter of the aperture being ground may be increased to any desired extent in excess of the diameter of the rotating grinding element. To this end, as shown in Figs. 2 and 5, the carriage 30 is provided with a laterally extending toe 115 in the upper surface of which is set a wear strip 116 on which bears a wear block 117 mounted on the lower spherical-shaped end of a screw 118. This structure of wear block and strip permits the carriage 30 to be reciprocated by the cam hub 37 as hereinbefore described. To hold the carriage with the wear members in engagement I provide a spring 119 connected at its lower end to a pin 120 on the base 20 and at its upper end to a pin 121 carried by an ear or lug 122 of the carriage 30. The screw 118 is mounted in a swinging carrier 123 pivoted at 124 in a recess of a standard 125 rising from the base 20, said swinging carrier being normally held in the full line position of Fig. 5 by a bolt or lock pin 126 having a head 127 (Fig. 2) by means of which said pin may be withdrawn and inserted. The upper end of the swinging carrier is formed with a divided head 128, the two portions of which are held together by a clamp screw 129 with sufficient friction to prevent the screw 118 from shifting out of its adjusted position. The object of this swinging carrier 123 is to temporarily displace the screw 118 and wear block 117 to substantially the dotted line position of Fig. 5, so that the carriage 30 may be swung about the rod 27 sufficiently to remove the roll 35 from the cam groove 36 with which it is engaged, to enable the cam hub 37 to be adjusted longitudinally, as hereinbefore described, to bring into position a different cam groove that will act to impart a different length of reciprocating movement to the carriage 30. In order that the carriage, including its toe 115, may be temporarily swung as described, the sides of the upper inner face of the standard 125 is cut away as at 130 (Figs. 2 and 5).

A pointer 131 rising from the carrier 123 (Figs. 1, 2, 3 and 5) co-acts with a scale on the upper surface of the head of screw 118 to enable the user of the machine to determine just how far the carriage shall be swung relatively to the axis of rod 27 to increase the diameter of the aperture being ground. If the scale marks are such that a movement of the screw from one mark to the next would indicate a shifting of the work one ten-thousandth of an inch, the amount of increase of the diameter of the aperture being ground would be increased two ten-thousandths of an inch, this being because the shifting of the work laterally increases one radius.

The construction and operation of the machine is such as to be practically almost noiseless, and it is desirable that the attendant shall be able to know that the grinding operation is finished or nearly so. To serve this purpose I have provided a buzzer, indicated conveniently at 132 in Fig. 2, a wire 133 connecting said buzzer with a light battery 134. A wire 135 connects the buzzer with the base of the machine and a wire 136 connects the battery with the top piece 50 of the carriage, which is insulated from the lower portion of the machine, but which of course supports the work. When the grinding element 65 is in full contact with the work, the circuit is so completed through the grinder and the work as to actuate the buzzer, but as the grinding proceeds to or toward a finish, the contact between the grinder and the work lessens and the operation of the buzzer diminishes. If, when the aperture is to be ground larger, the operator by turning the screw 118 brings the grinder and the work into closer relationship, the fact that the work is proceeding is indicated by the increased audible evidence imparted by the buzzer.

Having described the operation of the machine and its parts in connection with the description of the details thereof, further explanation of the operation of the machine as a whole will be unnecessary.

Having described my invention, I claim:

1. A grinding machine having a rotary work holder, means for positively supporting and driving both ends of a grinding element extending through the work carried by said holder, and means for relatively adjusting the holder and grinding element laterally.

2. A grinding machine having a pivotally mounted rotary work holder, means for positively supporting and driving both ends of a grinding element extending through the work carried by said holder, and means for laterally adjusting the work holder, be its pivot.

3. A grinding machine having two rotatable spindles and means for rotating them in unison, said spindles having means for grasping opposite ends of a grinding element and a work holder intermediate said spindles, said work holder having means for rotating it in a direction opposite to the direction of rotation of the spindles.

4. A grinding machine having a rotary work holder, means for rotatably supporting and driving both ends of a grinding element extending through the work carried by said holder, and means for traversing said work holder in the direction of the axis of the grinding element.

5. A grinding machine having means for rotatably supporting both ends of a grinding element, a carriage having a rotary work holder, and means for imparting a variable amount of traverse of said carriage in the direction of the axis of the grinding element.

6. A grinding-machine having a fixed rod, a work-supporting carriage longitudinally movable on said rod, means for automatically moving said carriage along the rod, and a rotary grinding element supported at both ends and having means for tensioning said element.

7. A grinding-machine having a fixed rod, a work-supporting carriage longitudinally movable on said rod, said carriage having a pin projecting therefrom, a rotary cam engaging said pin, and a rotary grinding element supported at both ends and having means for tensioning it.

8. A grinding-machine having a fixed support, a work-supporting carriage longitudinally movable on said support, a pin projecting from said carriage, a rotary hub having a plurality of cam grooves of different pitch, said hub being longitudinally adjustable to permit the carriage to be actuated by either one of said grooves, and means for supporting a grinding element to operate upon work supported by said carriage.

9. A grinding machine having a longitudinally movable work support, means for supporting a grinding element to operate upon work carried by said support, a rotary shaft having a series of notches, a hub splined on said shaft and having a plurality of cam grooves of different pitch, a latch carried by the hub to engage either one of said notches, and a pin projecting from the work-support to engage either one of said cam grooves.

10. A grinding-machine having two rotary spindles in alinement, said spindles having means for holding opposite ends of a grinding element, a sleeve shaft supporting one of said spindles, and means for longitudinally adjusting the spindle mounted in said sleeve shaft.

11. A grinding-machine having two rotary spindles in alinement, said spindles having means for holding opposite ends of a grinding element, a sleeve shaft supporting one of said spindles, and means for longitudinally adjusting the spindle mounted in said sleeve shaft, said means comprising a nut threaded upon one end of the spindle and bearing against the end of the sleeve shaft.

12. A grinding-machine having a sleeve shaft provided with a pin, a nut threaded on said sleeve shaft and having shoulders to engage said pin, a spindle mounted in said sleeve shaft and having a threaded projecting end, a nut mounted on said threaded end of the spindle, the opposite end of said spindle having means for holding one end of a grinding element, a rotary spindle having means for gripping the other end of said grinding element, and a work-holder between said spindles.

13. A grinding-machine having a fixed rod, a work-carriage mounted upon said rod and having a laterally extending projection, an adjusting-screw bearing upon said projection to oscillate the carriage upon said rod, and means for holding and rotating opposite ends of a grinding element extending through work supported by said carriage.

14. A grinding-machine having a fixed rod, blocks mounted upon said rod and having lateral projections, a guide for the projections of said blocks, said blocks being adjustable along said rod, spindles mounted in said blocks and having means for grasping opposite ends of a grinding element, and a work support mounted on said rod between said blocks.

In testimony whereof I have affixed my signature, in presence of two witnesses.

GEORGE W. BOWERS.

Witnesses:
A. W. HARRISON,
P. W. PEZZETTI.